Patented Aug. 9, 1949

2,478,767

UNITED STATES PATENT OFFICE 2,478,767

MANUFACTURE OF AZO COMPOUNDS

Roy C. Locke, Salem, N. J., assignor to E. I. du Pont de Nemours & Company, Wilmington, Del., a corporation of Delaware No Drawing. Application October 4, 1945, Serial No. 620,396

3 Claims. (Cl. 260—144)

This invention relates to the manufacture of azo compounds which find extensive use as pigmenting agents, and especially to novel processes for converting certain of the azo intermediates into finished products, which are devoid of solubilizing substituents in a single reaction medium.

Heretofore, it was customarily the practice in making azo compounds to diazotize the primary amine in an acid medium at a low temperature, say 40° F., and then to mix this cold acid diazo solution, which has a low pH value of about 2.0, with an alkaline solution of the coupling component, which has a high pH value of about 10.7. In effecting these couplings in large or commercial lots much difficulty has been encountered in controlling the methods used. Among these difficulties is the necessity of using relatively large excesses of diazo components and diazotizing agents because of the relative instability of nitrous acid and the diazo of the primary arylamine in the diazotizing medium. In acid, aqueous media of the concentration used for diazotization, nitrous acid reacts slowly with primary arylamines which are sparingly soluble, and the diazotization, as practiced heretofore, is consequently time consuming. Special treatments and highly skilled handling were necessary in order to avoid the formation of decomposition products or by-products which have deleterious effects on the final products. The combining of two solutions of such widely differing pH value made necessary the use of coupling media having a varying pH value which traversed a wide pH range during the mixing of the acid and alkaline solutions, and this condition favored the formation of products of inferior quality. Accordingly, the reactants were subjected to a wide range of conditions during the process of coupling wherein ample opportunity to form a variety of kinds and amounts of inferior coupling products or disadvantageous by-products was afforded.

The production of by-products and inferior coupling products was enhanced by these variables. The timing of different operators, or even the timing of the same operators in manufacturing different batches of products affected the products. Rates of combining the solutions, temperature variations, and volume relationships often became so critical as to be hardly capable of repetition in manufacturing operations. It followed that pigments having wide variations in properties and undesirable defects were produced sometimes in manufacturing operations from raw materials of the best quality and remedial measures were wanting. Undesired nitrosation products were often unavoidably formed and these impaired the properties and yield of the coupled products. Constant or exact standards of manufacture were most difficult to attain by the processes of the prior art and improved processes were desirable.

I have now discovered that many of the defects of the prior art processes can be avoided by the processes of the present invention in which diazotization and coupling reactions are carried on in one and the same reaction medium. The coupling reaction goes on at such a rapid rate that it may be considered in effect to be simultaneous with or progress with equal speed as the diazotization. In the processes of the present invention higher pH values are preferred than those heretofore considered to be practicable for the diazotization of the diazo component and the coupling proceeds at the same pH. The best diazotization and coupling efficiencies are attained by using complete solutions of the components. The range of pH value within which the double reaction of diazotization and coupling takes place instantaneously in the medium has been determined.

It is among the objects of the present invention to provide novel improved processes for manufacturing azo compounds which are devoid of solubilizing groups. Another object of the invention is to provide a simplification of the diazotization and coupling reactions involved in the manufacture of such compounds. A further object is to provide methods wherein diazotization and coupling take place instantaneously and in the same medium. Another object of the present invention is to provide an improved practicable continuous process for making azo products in a single combining operation. Other objects will be apparent from the following description.

The objects of the invention are attained in general by mixing a mineral acid water solution containing the diazotizable component and an alkaline water solution containing the coupling component and a diazotizing agent, the mixing together of these solutions being at a rate and in such volume and concentrations that the pH of the resulting reaction mixture will be maintained at a pH value of about 6.0 to about 7.2 from the beginning of the mixing to the end of the reaction. It has also been found that the molar ratio of mineral acid to diazotizable amine should be about 2 to about 2.4 parts of mineral acid to 1 part diazotizable amine and the temperature of the reaction medium should be at least about 70° F.

in order to attain the improved results. The mixture is desirably made by continuously combining relatively small portions of the solutions in unit time with continuous thorough mixing so as to avoid more than a momentary period of non-adjusted pH, the same being a short initial mixing period wherein no considerable coupling has taken place. This may be done by slowly drawing streams of both of the solutions from their respective containers and uniting the streams in a third container whilst maintaining the pH value of the mixture within the above stated range and maintaining thorough agitation of the mixture. The compositions of the several solutions and the rate of withdrawal of solution from each vessel are regulated, by any convenient means, so as to combine the acid, alkali and dye components in the above described desired proportions. In general, about equimolecular proportions of the components of the azo compound are desirable, but departure therefrom is tolerable.

The invention will be more fully set forth in the following more detailed description which includes examples that are given as illustrative embodiments of the invention and not as limitations thereof. Parts are expressed in parts by weight unless otherwise specified.

*Example I*

A solution of diazotizable primary aryl amine was made by adding 152 parts of para-nitro-ortho-toluidine 100% (1 mole) to 500 parts of water with good agitation and stirring until a uniform slurry was obtained, then 730 parts of hydrochloric acid 10% (2 moles—HCl—100%) were added with stirring until a uniform suspension was obtained. The mixture was diluted to 7000 parts with water at 70° F. and stirred 30 minutes to obtain a complete solution of the intermediate. It was then made up to a final volume of 15,000 parts by adding water at 75° F. The final temperature was adjusted to 100° F.

A solution of coupling component was made by mixing together 262 parts of the anilide of beta-hydroxy-naphthoic acid 100% (1 mole), 400 parts caustic soda 10% (1 mole—NaOH—100%), and 10 parts Turkey red oil 50% (5 parts sulfonated castor oil 100%) and heating to 160° F. with good agitation, then adding 2000 parts of water and holding the temperature at 160° F. until the intermediate was completely dissolved. Sixty-nine parts of sodium nitrite (1 mole 100%) were added with stirring until completely dissolved. The solution was then made up to a final volume of 15,000 parts with water and the temperature was adjusted to 150° F.

The solution of diazo component and the solution of coupling component were mixed in a third reaction vessel by pouring them into the vessel at a regular rate during a 30-minute period and controlling the rates to maintain a pH in the mixture ranging from 6.0 to 7.2 throughout the combining operation. The usual tests for completeness of coupling and final pH were made thereafter.

The pigment thus formed was filtered out and washed with water at 75° F. The filter cake was dried at 140° F. and the dry pigment was ground to a fine powder. A bright red pigment was obtained in yields of 99.8% of theory.

When tested as a lithographic ink the masstone was darker and the tinctorial strength 15% greater than a product made by the prior art method of preforming the diazo and then coupling it to the second component in separate media.

Instead of using the batch process described above, the solutions may be metered into a small vessel fitted with a high speed agitator. The pigment slurry can then be drawn off continuously by overflow, dewatered and dried by continuous methods commonly employed for such purposes.

*Example II*

Another pigment was prepared by a method similar to Example I except that a half molecular equivalent of dianisidine was substituted for the diazo component and a molecular equivalent of the ortho-anisidide of beta-hydroxy-naphthoic acid was substituted for the coupling component of Example I.

A theoretical yield of bright blue pigment was obtained which was brighter in masstone and redder in shade when tested as a lithographic ink than a product of the prior art made from the same components by coupling a preformed tetrazo to the second component.

*Example III*

A paste composed of 126 parts of 3:3′ dichlor-benzidine 100% (0.5 mole) in 876 parts of 10% hydrochloric acid (2.4 moles HCl 100%) was added to 1000 parts of water at 75° F. and heated to 180° F. Then 5000 parts water at 180° F. were added and the mixture was stirred until complete solution of the intermediate was obtained. The resulting solution was treated with 25 parts of "Filtercel" and 17.5 parts of "Nuchar," stirred 15 minutes, filtered and made up to 10,000 parts with water to obtain a clear solution at 180° F.

A paste composed of 178 parts acetoacetanilide 100% (1 mole) in 5000 parts water at 75° F. was added to 960 parts of 10% caustic soda (2.4 moles NaOH 100%) and stirred at 75° F. until complete solution was obtained. Then 69 parts of sodium nitrite 100% (1 mole) and 46 parts formic acid 100% (1 mole) were added in turn and the solution was made up to 10,000 parts with water at 75° F.

The first of the above solutions at 180° F. and the second solution at 75° F. were gradually and simultaneously added to 15,000 parts of water at 100° F. during a 30 minute period whilst maintaining a temperature of 100°–120° F. and a pH of 6.5–7.2 throughout the combining operation. The usual tests for completeness of coupling and final pH were made and the mixture was stirred for 2 hours at this temperature and finally heated to 190° F. for 30 minutes.

The resulting product of coupling was filtered off, the press cake was dried at 140° F. and the dry color was pulverized.

The yellow pigment was obtained in approximately theoretical yield. It gave a lithographic ink having a dark masstone and a redder shade than the ink from pigment made from the same intermediates by coupling a preformed tetrazo to the second component. The pigment is more stable than pigments made from the same components by prior art processes.

*Example IV*

A continuous process for making azo pigment dyestuffs may be carried out by preparing solutions as described in Example I, metering these solutions severally into the suction side of a pump in the proportions that they are mixed in accordance with the procedure of Example I for rapidly mixing them. The solutions are then passed into a coiled tube which may be baffled on the inside for more vigorous agitation, or through a small diameter tube at such a rate that turbulent flow is produced, such as that described in United States Patent No. 2,021,143 to Calcott and Williams. Heat may be applied to all or part of the coil if desired. The finished pigment slurry which comes from the end of the coiled tube can then be dewatered, washed and dried continuously by standard mechanical methods.

The concentrations of the several solutions which are mixed to form the reaction mixture may be varied over a wide range but the content of solids in the initial solutions should not exceed that which is completely in solution. Care should be taken to make the mixture so that all diazotization takes place in a medium having a pH value between about 6.0 and about 7.2. The ensuing coupling thereupon immediately takes place in a medium having the same pH range rather than in one having the wide change in pH from about 10.7 to about 6.5 to 7.0 which is produced, for example, by adding gradually an acid solution such as that described in the examples to an alkaline solution. In such a gradual mixing of the acid component into a mass of coupling component in alkaline solution, a condition commonly encountered in commercial manufacturing operations, the reaction at the start would take place in a medium having a pH value of about 10.7 and this value would be gradually reduced to a pH value of 6.5 to 7.0 at the end. However, when the mixing will have been completed in such manner a large proportion of the coupling or other reaction will have been completed in a high pH medium and the products will have the undesirable properties of products coupled in high pH media, among which is the varying crystalline structure and intermediate products which are not produced in the processes of the present invention.

In the present process no energy is lost in cooling the solutions to low temperatures such as those approximating freezing and then heating them to room temperature or higher before the reaction is completed. In the present process, about room temperature, say, about 70° F., to as high as the boiling point of the coupling medium give the best products, and this temperature range is otherwise preferred for economic reasons. Large excesses of acid or alkali are not required in the processes of the invention. They may be used in stoichiometric proportions for producing the final pH values herein pointed out. In all cases the alkali metal nitrite should be dissolved in the alkaline solution and the primary arylamine should be dissolved in a non-oxidizing mineral acid. Since the nitrous acid is formed continuously as the mixture is made, and it is used up as fast as it is formed, it is unnecessary to employ excesses of alkali metal nitrite such as those which are necessary in processes where the diazo is first made in a batch and then mixed with the alkaline solution of coupling component. The concentrations of the components in the water solutions can be varied over a wide range but it is necessary to employ complete solutions.

In the present process all the necessary ingredients and optimum conditions for diazotization and coupling are produced at one and the same moment with the result that insoluble or partially soluble by-products are not formed. By producing these optimum conditions simultaneously and without being accompanied with undesirable side reactions, the pigment is formed in a desirable state of subdivision which improves the properties of the product over products made in accordance with prior art methods.

The present processes are susceptible of easy and accurate control and more uniform products can be made than those which are produced by prior art methods. The present invention makes possible for the first time a continuous process for the production of azo pigments. The invention provides processes whereby pigments of greater tinctorial strength and uniformity of shade are produced as compared to those produced by prior art processes.

I claim:

1. The process which comprises gradually mixing in small increments a body of mineral acid water solution of a diazo component which is devoid of water solubilizing acid groups and a body of an alkaline water solution containing a diazotizing agent and a coupling component which is devoid of water solubilizing acid groups, completely mixing the solutions as fast as diazotization of the diazotizing agent progressively takes place, and maintaining a mixture having a pH value of about 6.0 to about 7.2, in the mixture, the acid and the diazotizable amino compound being present in about the proportion of 2 to 2.4 parts of mineral acid to 1 part of diazotizable amino compound, and the temperature of the solutions being sufficient to make a mixture having a temperature of about 70° F. to the boiling point of the mixture.

2. A process in accordance with claim 1 in which the diazo component is not in excess of that which will couple with all of the coupling component present in the mixture.

3. A process in accordance with claim 1 in which the acid and the alkaline solutions are continuously and gradually mixed in a receptacle, and the resulting slurry containing the coupled product is continuously removed from the receptacle.

ROY C. LOCKE.

REFERENCES CITED

The following references are of record in the file of this patent:

UNITED STATES PATENTS

| Number | Name | Date |
| --- | --- | --- |
| 1,922,463 | Turski | Aug. 15, 1933 |
| 1,999,026 | Tramm | Apr. 23, 1935 |
| 2,025,916 | Tramm | Dec. 31, 1935 |
| 2,182,721 | Conzetti | Dec. 5, 1939 |
| 2,277,778 | Randall | Mar. 31, 1942 |
| 2,349,561 | Reynolds | May 23, 1944 |
| 2,410,219 | Langstroth | Oct. 29, 1946 |

OTHER REFERENCES

Saunders, "The Aromatic Diazo-Compounds and their Technical Applications," London, 1936, pages 4, 5, 9, 104, 118.